United States Patent
Chew et al.

(10) Patent No.: US 7,311,431 B2
(45) Date of Patent: Dec. 25, 2007

(54) LIGHT-EMITTING APPARATUS HAVING A PLURALITY OF ADJACENT, OVERLAPPING LIGHT-GUIDE PLATES

(75) Inventors: Tong Fatt Chew, Penang (MY); Siew It Pang, Penang (MY); Ju Chin Poh, Penang (MY); Fook Chuin Ng, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 85 days.

(21) Appl. No.: 11/096,950

(22) Filed: Apr. 1, 2005

(65) Prior Publication Data

US 2006/0221638 A1 Oct. 5, 2006

(51) Int. Cl.
*F21V 8/00* (2006.01)

(52) U.S. Cl. .................. 362/613; 362/600; 362/606; 362/615; 362/616

(58) Field of Classification Search ............... 362/600, 362/606, 612, 613, 615, 616; 349/58, 61, 349/62, 65
See application file for complete search history.

(56) References Cited

U.S. PATENT DOCUMENTS

| | | | |
|---|---|---|---|
| 6,241,358 B1 | 6/2001 | Higuchi et al. | |
| 6,381,068 B1* | 4/2002 | Harada et al. | 359/443 |
| 6,464,367 B2 | 10/2002 | Ito et al. | |
| 2001/0017774 A1* | 8/2001 | Ito et al. | 362/31 |
| 2001/0053072 A1* | 12/2001 | Takemoto | 362/31 |
| 2002/0175632 A1 | 11/2002 | Takeguchi | |
| 2003/0206253 A1 | 11/2003 | Cho | |
| 2004/0061814 A1 | 4/2004 | Kim et al. | |
| 2004/0085751 A1* | 5/2004 | Okuwaki et al. | 362/31 |
| 2004/0114345 A1* | 6/2004 | Kim et al. | 362/31 |
| 2004/0130884 A1 | 7/2004 | Yoo et al. | |
| 2005/0007751 A1* | 1/2005 | Tsai | 362/23 |
| 2005/0030732 A1* | 2/2005 | Kimura et al. | 362/31 |
| 2005/0094403 A1* | 5/2005 | Liu | 362/318 |
| 2006/0098441 A1* | 5/2006 | Chou | 362/294 |

FOREIGN PATENT DOCUMENTS

DE 102004046256 A1 4/2006

(Continued)

OTHER PUBLICATIONS

German Office Action dated Jan. 8, 2007 involving counterpart German application No. 10 2005 056 646.4-51.

(Continued)

*Primary Examiner*—Sandra O'Shea
*Assistant Examiner*—Mary Zettl

(57) ABSTRACT

In one embodiment, a light-emitting apparatus includes a plurality of adjacent, overlapping light-guide plates formed of substantially transparent material, and a plurality of light sources. Each of the light-guide plates has i) first and second ends, ii) one or more substantially transparent surfaces through which light is emitted, and iii) one or more reflective surfaces to redirect light within the light-guide plate. Where first and second light-guide plates are adjacent, the first end of the first light-guide plate A) underhangs the second end of the second light-guide plate, and B) is positioned opposite a primary light-emitting side of the apparatus. The plurality of light sources are optically coupled to the first ends of the light-guide plates so as to illuminate the interiors of the light-guide plates.

38 Claims, 5 Drawing Sheets

FOREIGN PATENT DOCUMENTS

| | | |
|---|---|---|
| EP | 0 987 490 | 3/2000 |
| JP | 09-186825 A | 7/1997 |
| JP | 2000127847 A * | 5/2000 |
| JP | 2004-206916 | 7/2004 |
| WO | WO 2006/004160 | 1/2006 |

OTHER PUBLICATIONS

English translation of German Office Action dated Jan. 8, 2007 involving counterpart German application No. 10 2005 056 646.4-51.

U.K. Search Report dated Jun. 30, 2006 involving couterpart U.K. application No. GB0605970.3.

* cited by examiner

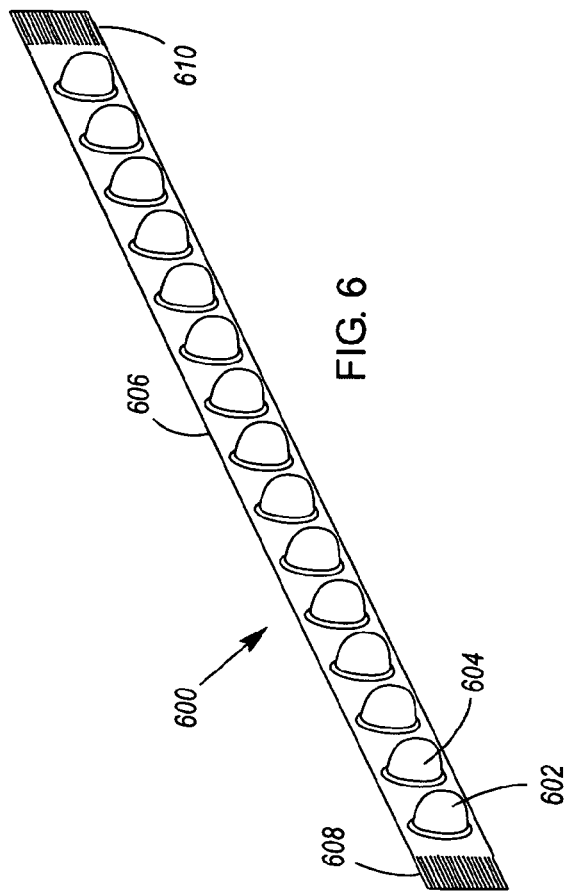

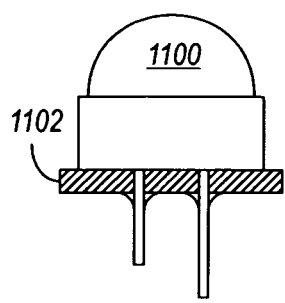
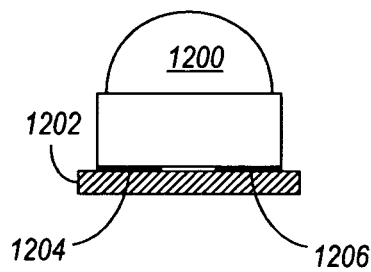
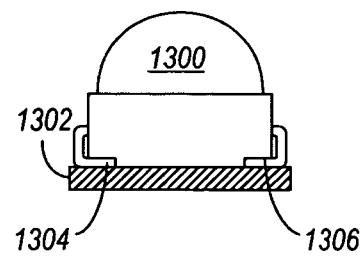
FIG. 11  FIG. 12  FIG. 13
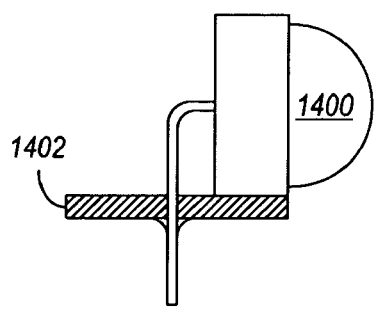
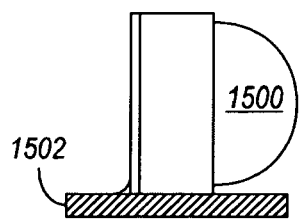
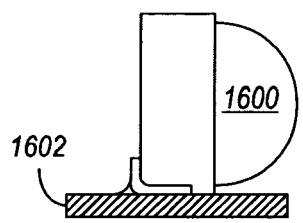
FIG. 14  FIG. 15  FIG. 16

LIGHT-EMITTING APPARATUS HAVING A PLURALITY OF ADJACENT, OVERLAPPING LIGHT-GUIDE PLATES

BACKGROUND

A transmissive liquid crystal display (LCD) is one that requires a backlight to provide its illumination. Often, the backlight comprises a generally planar light-guide having a transparent side, a reflective side, and a plurality of edges. Light from one or more light sources is projected such that it enters one or more of the light-guide's edges, reflects off of the light-guide's reflective side, and is emitted through the light-guide's transparent side. The light sources may take various forms, including those of a cold-cathode fluorescent lamp (CCFL) or light emitting diode (LED) array.

In some cases, a backlight's light-guide is edge-lit by, for example, one or more CCFLs or LED arrays that are positioned adjacent one or more of the light-guide's edges. Exemplary edge-lit light-guides are disclosed in more detail in U.S. Patent Application Publication 2002/0175632 A1, entitled "LED Backlight", and in U.S. Patent Application Publication 2004/0130884 A1, entitled "Backlight Unit of Display Device and Liquid Crystal Display Device Using the Same".

In other cases, a backlight's light-guide is bottom-lit by, for example, one or more CCFLs or LED arrays that are positioned below the light-guide's reflective side. The light source(s) project light into a secondary light-guide positioned below the primary light-guide. Light exiting this secondary light-guide is then reflected around and into one or more edges of the primary light-guide. Exemplary bottom-lit light-guides are disclosed in more detail in U.S. Patent Application Publication 2004/0061814 A1, entitled "Backlight Device for Liquid Crystal Display and Method of Fabricating the Same".

SUMMARY OF THE INVENTION

In one embodiment, a light-emitting apparatus comprises a plurality of adjacent overlapping light-guide plates and a plurality of light sources. The plurality of adjacent light-guide plates are formed of substantially transparent material, with each light-guide plate having i) first and second ends, ii) one or more substantially transparent surfaces through which light is emitted, and iii) one or more reflective surfaces to redirect light within the light-guide plate. Where first and second light-guide plates are adjacent the first end of the first light-guide plate A) underhangs the second end of the second light-guide plate, and B) is positioned opposite a primary light-emitting side of the apparatus. A plurality of light sources are optically coupled to the first ends of the light-guide plates so as to illuminate the interiors of the light-guide plates.

Other embodiments are also disclosed.

BRIEF DESCRIPTION OF THE DRAWINGS

Illustrative embodiments of the invention are illustrated in the drawings, in which:

FIG. 3 illustrates an exploded view of one of the light-guide plates shown in FIG. 1;

FIGS. 4 & 5 illustrate alternate configurations of the substrate shown in FIG. 1;

FIG. 6 illustrates an array of LEDs forming one of the light sources shown in FIGS. 1-3;

FIGS. 11-16 illustrate various LED mounting configurations;

DETAILED DESCRIPTION

Figure 1:
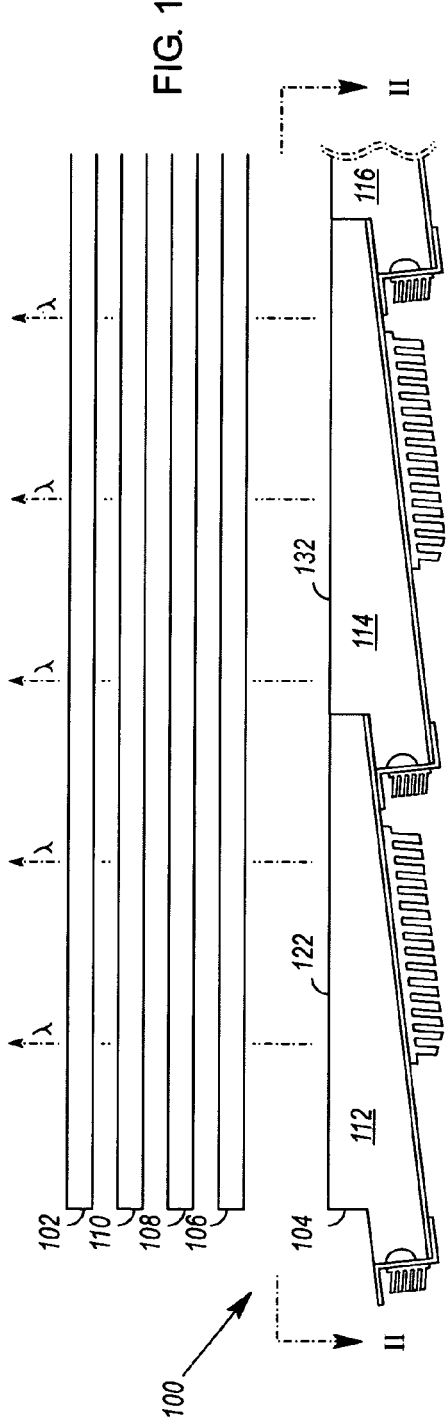
FIG. 1 illustrates an elevation of a liquid crystal display.

FIG. 1 illustrates an elevation of a liquid crystal display (LCD) 100. The LCD 100 comprises an LCD panel 102 having a plurality of LCD elements, and a backlight 104 that is positioned behind the LCD panel 102 so as to project light through the LCD panel 102. Optionally, the LCD 100 may comprise one or more light conditioners 106, 108, 110 positioned between the LCD panel 102 and backlight 104. The light conditioners may include one or more light diffusing layers (e.g., a diffuser 106), one or more prismatic layers (e.g., a brightness enhancement film (BEF) 108), and/or one or more light polarizing layers (e.g., a dual brightness enhancement film (DBEF) 110). These light conditioner layers 106, 108, 110 may take the form of elements, sheets or films that are positioned between, or applied to, one or both of the LCD panel 102 and the backlight 104.

Figure 2:
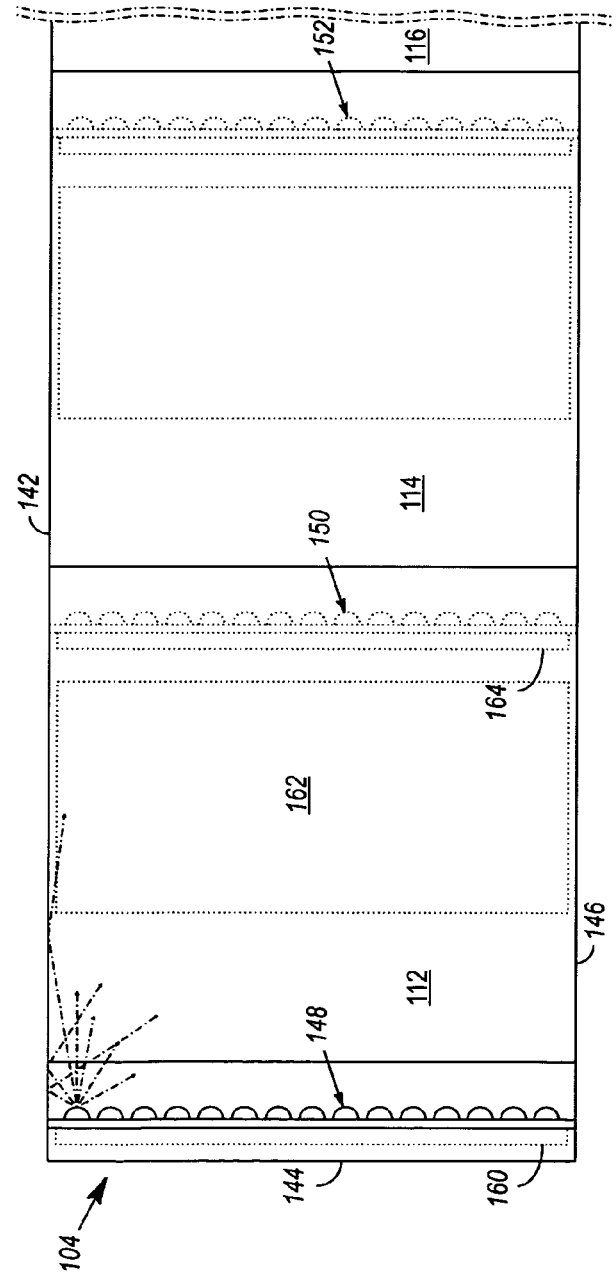
FIG. 2 illustrates a plan view of the backlight shown in FIG. 1.
Figure 7:
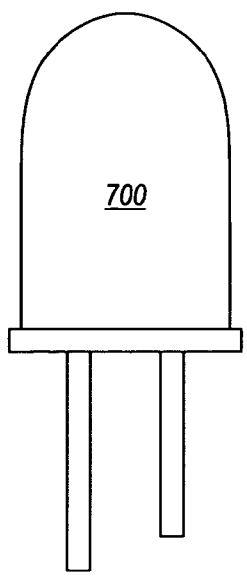
FIGS. 7 & 8 illustrate alternate views of an oval-shaped LED.
Figure 9:
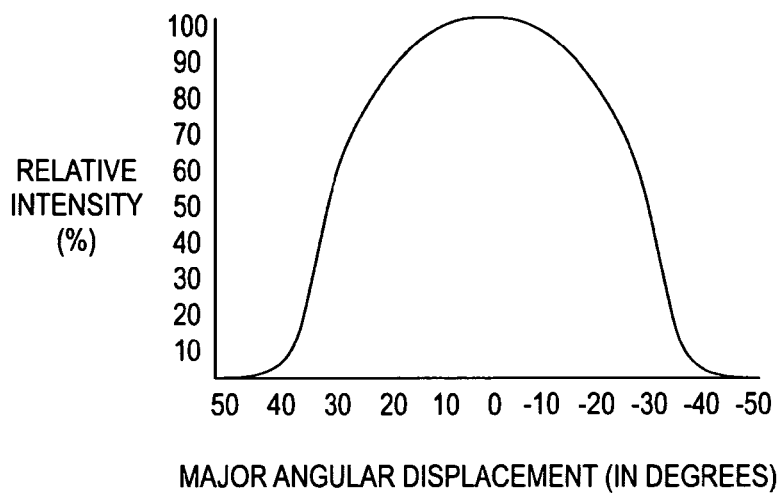
FIGS. 9 & 10 illustrate plots of luminous intensity for the major and minor axes of the oval-shaped LED shown in FIGS. 7 & 8.
Figure 8:
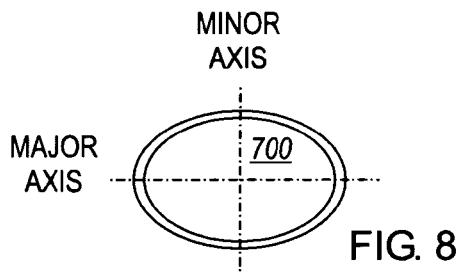
Figure 10:
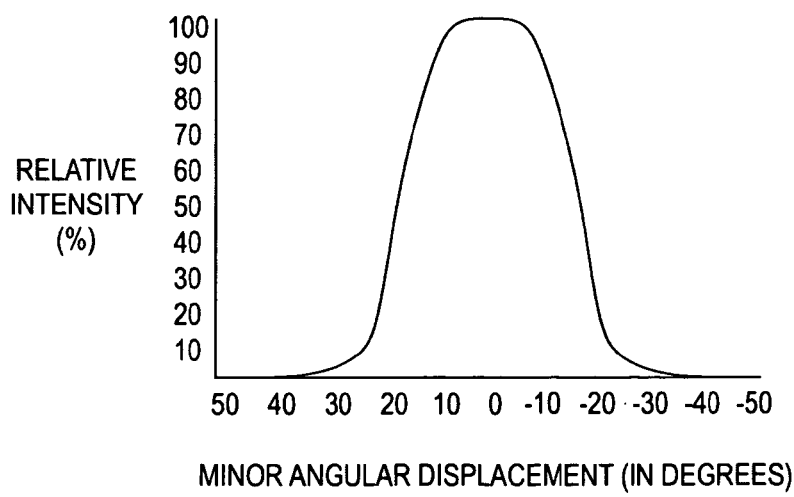

As shown in FIGS. 1 & 2, the backlight 104 comprises a plurality of adjacent, overlapping light-guide plates 112, 114, 116, each of which is formed of substantially transparent material. Examples of transparent materials that can be used in forming the light-guide plates 112, 114, 116 include, but are not limited to: glass, acrylic (e.g., polymethylmethacrylate (PMMA)) and polycarbonate.

Each of the light-guide plates 112, 114, 116 has first and second ends 118, 120 (FIG. 3) one or more substantially transparent surfaces 122 trough which light (λ) is emitted, and one or more reflective surfaces 124, 126 (FIG. 3) to redirect light within the light-guide plate 112. Preferably, the reflective surfaces 128, 130 of each light guide plate 114 comprise a first reflective surface 128 that is substantially opposite a primary light-emitting surface 132 of the light-guide plate 114, and a second reflective surface 130 that underhangs and abuts an adjacent light-guide plate 112.

As is best seen in FIG. 3, where first and second light-guide plates 114, 112 are adjacent, the first end 134 of the first light-guide plate 114 1) underhangs the second end 120 of the second light-guide plate 112, and 2) is positioned opposite the primary light-emitting side 122, 132 of the backlight 104.

The vertical surfaces 136, 138 of a light-guide plate 112 may be either transparent or reflective. Preferably, vertical, abutted surfaces 138, 140 of adjacent light-guide plates 112, 114 are transparent so that light can travel from one light-guide plate 112 to the other 114. However, these adjacent vertical surfaces 138, 140 could alternately be reflective.

The vertical and horizontal surfaces 142, 144, 146 (FIG. 2) defining the perimeter of the backlight 104 are preferably reflective so that light does not stray from the perimeter of the backlight 104. However, these perimeter surfaces 142, 144, 346 could alternately be transparent.

The backlight 104 further comprises a plurality of light sources 148, 150, 152 that are optically coupled to the first ends 118, 134 of the light-guide plates 112, 114, 116 so as to directly and indirectly illuminate the interiors of the light-guide plates 112, 114, 116.

In the backlight 104 shown in FIGS. 1-3, the light-guide plates 112, 114, 116 are assembled on (or supported by) a substrate 154. As shown, the substrate 154 may be assembled from a plurality of overlapping components comprised of planar components 156 and stepped components 158. FIG. 4 illustrates an alternate embodiment of the substrate, wherein the substrate 400 is assembled from a plurality of like components 402a, 402b. FIG. 5 illustrates a second alternate embodiment of the substrate, wherein the substrate 500 is formed as an integrated piece.

The substrate 154 for the backlight 104 may be formed using various materials, including, for example, a metal such as aluminum. Preferably, the substrate's material(s) are chosen to give it a substantially rigid and thermally conductive structure. In this manner, the substrate 154 may not only provide support for the light-guide plates 112, 114, 116, but may also help to disperse the heat that is generated as a result of the light-guide plates 112, 114, 116 being lit. If additional heat dissipating elements (e.g., heat sinks 160, 162, 164) are needed, they may be coupled to either or both of the planar and stepped components 156, 158 of the substrate 154.

In addition to being assembled on a substrate 154, the light-guide plates 112, 114, 116 may be joined at their abutting edges 138, 140 by a bonding material. Alternately, the light-guide plates 112, 114, 116 may be bonded to one another at their abutting edges 138, 140 in lieu of their being assembled on the substrate 154.

If it is desired that light travel from one light-guide plate 112 to another 114, a substantially transparent bonding material may be chosen, such that the light-guide plates 112, 114, 116 and their bonding material form a substantially continuous light-emitting surface 122, 132. Alternately, the abutting edges 138, 140 of adjacent light-guide plates 112, 114 may be optically isolated by means of one or both of the edges being provided with a reflective surface (or, for example, by inserting a reflective element or film between the abutting edges 138, 140). If separated by one or more reflective surfaces, the optical cross-talk between adjacent light-guide plates 112, 114 can be mitigated.

The light-guide plates 112, 114, 116 may be variously shaped and sized. Preferably, the underhanging surfaces 130, 166, 168 of a light-guide plate 114 (i.e., those that underhang an adjacent light-guide plate 112) are reflective. In addition, the height and width of a light-guide plate's underhanging end 134 are chosen such that light rays emitted by the light source 150 are incident on the light-guide plate's transparent surface 132 at an angle $\Theta_1$ that exceeds the critical angle of reflection between the medium of the light-guide plate 114 and the medium to which the transparent surface 132 is exposed (e.g., air). By way of example, the critical angle of reflection is about 32° for a flint glass-air interface, and about 45° for a silicone-air interface.

For purposes of further illustration, consider a case wherein the critical angle of reflection for a light-guide plate 112, 114, 116 is about 32°. In this case, the height and width of the light-guide plate's underhanging end 134 may be chosen such that the maximum angle, $\Theta_1$, at which a light ray emitted by the light source 150 strikes the transparent surface 132 is 32°. Thus, for light emitted directly from the light source 150, there is total internal reflection within the light-guide plate 114. Given this total internal reflection, all light emitted by the light source 150 must reflect off of the reflective surface 128 before refracting through the transparent surface 132. In this manner, the light may be better dispersed and/or color mixed by means of 1) the material of the light-guide plate 114, and 2) the character of the reflective surface 132. In most cases, better light dispersion and/or color mixing enables the backlight 104 to provide a backlight of a more uniform color and luminance.

To aid in dispersing and/or color mixing light within a light-guide plate 112, its reflective surfaces 124, 126 may take various forms. For example, its reflective surfaces 124, 126 may be diffused reflective surfaces, specular reflective surfaces, polarizing reflective surfaces, or some combination thereof. Different reflective surfaces, such as a light guide's first and second reflective surfaces 124, 126, may take different forms.

In one embodiment, a diffused reflective surface may take the form of a uniform diffused surface (i.e., a diffused surface that provides substantially the same diffusion at any point of the surface). In another embodiment, a diffused reflective surface may take the form of a dot pattern of diffused reflective surfaces. In this latter case, a specular reflective layer may be positioned below the dot pattern for the purpose of directing light that leaks past the dot pattern back into a light-guide plate 112. By way of example, the specular reflective layer may take the form of a specular sheet inserted between the light-guide plates 112, 114, 116 and the substrate 154. Alternately, the specular reflective layer may take the form of a specular coating or film applied to the light-guide plates 112, 114, 116 or substrate 154.

As shown in FIG. 3, the primary transparent and reflective surfaces 122, 124 of each light-guide plate 112 may form an angle, $\Theta_2$. In one embodiment of the backlight 104, the angle $\Theta_2$ is between 0° and 20°.

As shown in FIG. 1, the primary transparent surfaces 122, 132 of the light-guide plates 112, 114, 116 may abut to form a substantially continuous light-emitting area. However, they need not form a continuous light-emitting area, and may instead form a curved or textured light-emitting area. In some cases, the shape of (or coatings on) the primary transparent surfaces 122, 132 may help to further mix, diffuse or polarize light emitted from the backlight 104. Likewise, the other surfaces 124, 126, 136, 138 of a light-guide plate 112, whether transparent or reflective, may be curved or a combination of flat and curved.

The light sources 148, 150, 152 of the backlight 104 may take various forms, which forms may be used alone, or in combination with other forms. In one embodiment, the light sources 148, 150, 152 may take the form of arrays 600 of light-emitting diodes (LEDs). See FIG. 6. The individual LEDs (e.g., 602, 604) of an array 600 may be of the same or different colors. For example, all of the LEDs 602, 604 in an array 600 may emit white light. Or, an LED array 600 may comprise a plurality of differently colored LEDs 602, 604, each of which emits, for example, red, green or blue light. When an LED array 600 comprises differently colored LEDs 602, 604, the drive signals of the differently colored LEDs 602, 604 may be adjusted to control the color point of the mixed light emitted by the LED array 600.

In one useful combination of LEDs, differently colored LEDs may emit dominant light wavelengths between 450 and 490 nanometers (nm) (bluish light), between 510 and 550 nm (greenish light), and between 610 and 650 nm (reddish light). In another useful combination of LEDs, differently colored LEDs may emit dominant light wavelengths between 450 and 480 nanometers (bluish light), between 480 and 520 nm (bluish-green light), between 520 and 550 nm (greenish light), and between 610 and 650 nm (reddish light).

In one embodiment, the luminous intensity spatial distribution of an LED may be rotationally symmetric about the LED's optical axis. This is typical of LEDs having a round horizontal cross-section. Alternately, and as shown in FIGS. 7-10, an LED 700 may have an oval-shaped luminous intensity spatial distribution, with distinct major and minor axes in its luminous intensity spatial distribution. See, for example, the plots of luminous intensity (FIGS. 9 & 10) for the major and minor axes of the oval-shaped LED shown in FIGS. 7 & 8. An LED 700 having an oval-shaped luminous intensity spatial distribution is useful in that the LED's major axis can be oriented substantially horizontally to the rather thin plane of the backlight 104, and the LED's minor axis can be oriented substantially vertically to the plane of the backlight 104, thereby enabling the LED 700 to illuminate a wider "strip" of a light-guide plate 112 and mitigating illumination banding affects as a result of LED spacing. LEDs having oval-shaped luminous intensity spatial distributions can also sometimes decrease the number of LEDs that must be provided in an array 600.

It has been found through experimentation that, for backlights having thin depths and relatively large expanses (e.g., LCD television backlights), it is advantageous to fit a backlight 104 comprised of overlapping light-guide plates 112, 114, 116 with oval-shaped LEDs 700 having luminous intensity spatial distributions with a viewing angle of between 20° and 90° in their minor axes and between 60° and 180° in their major axes.

The light sources 148, 150, 152 of the backlight 104 may take a number of forms. For example, a light source 148 may take the form of an array 600 of LEDs 602, 604 that is mounted on a substrate 606 having electrical connections 608, 610 thereon (e.g., as shown in FIG. 6). This LED substrate 606 may be mounted between one of the light-guide plates 112 and the substrate 154 that supports the light-guide plates 112, 114, 116 (e.g., by first mounting the LED substrate 606 to the light-guide plate 112, or by first mounting the LED substrate 606 to the substrate 154).

In one embodiment, the substrate 606 on which the LEDs 602, 604 are mounted may be a flexible printed circuit (FPC). In another embodiment, the substrate 606 on which the LEDs 602, 604 are mounted may be a metal core printed circuit board (MCPCB). In the latter case, the MCPCB may function not only as the LED substrate 606, but as part of the substrate 154 on which the light-guide plates 112, 114, 116 are assembled. Otherwise, a substrate 606 such as a FPC may be mounted to (or abutted to) an aluminum substrate with a dielectric interposed there-between.

The LEDs 602, 604 may be mounted to the substrate 606 in a variety of ways, including by through-hole or surface-mount methods. FIG. 11 illustrates the mounting of an exemplary through-hole LED 1100 to a substrate 1102. FIGS. 12 & 13 illustrate the mounting of two different surface-mount LEDs 1200, 1300 to a substrate 1202, 1302 (with the first LED 1200 comprising a pair of pads 1204, 1206 on its underside, and with the second LED 1300 comprising a pair of contacts 1304, 1306 that wrap around and under the edges of the LED's package). Note that with each of the LEDs 1100, 1200, 1300 illustrated in FIGS. 11-13, the LED's optical axis extends perpendicularly from the substrates 1102, 1202, 1302.

FIG. 14 illustrates the mounting of a right-angle through-hole LED 1400 to a substrate 1402. As shown, the LED 1400 may be mounted such that it overhangs an edge of the substrate 1402 on which it is mounted, which in some cases may allow it to be mounted closer to (or extend into) a light-guide plate 112. FIGS. 15 & 16 illustrate the mounting of various right-angle surface-mount LEDs 1500, 1600 to a substrate 1502, 1602. Note that with each of the LEDs 1400, 1500, 1600 illustrated in FIGS. 14-16, the LED's optical axis extends parallel to the substrates 1402, 1502, 1602.

Although the LED array 600 shown in FIG. 6 comprises only a single row of LEDs 602, 604, an LED array 600 could alternately comprise multiple rows of LEDs, with the rows forming parallel columns, or with the LEDs of different rows forming a zigzag or other pattern, as desired to achieve a uniform (or non-uniform) distribution of light intensity and color for the given type or types of LEDs that form the array 600.

Figure 17:
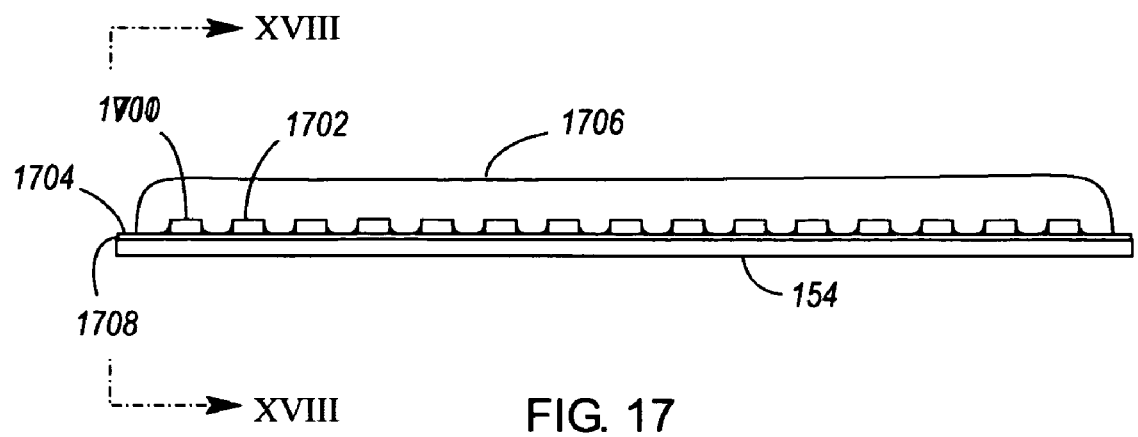
FIGS. 17 & 18 illustrate alternate views of a plurality of LED chips mounted on a substrate.
Figure 18:
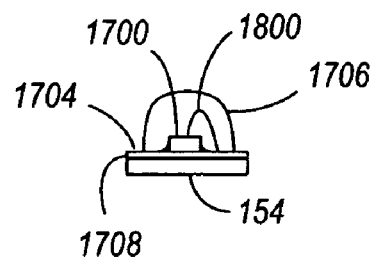

FIGS. 17 and 18 illustrate an alternative to mounting packaged LEDs 602, 604 on a substrate 606. As shown, a plurality of LED chips 1700, 1702 may be attached to a substrate 1704, and surface mounts and/or wirebonds 1800 may be used to electrically couple the LED chips 1700, 1702 to traces or pads on the substrate 1704. An encapsulant 1706 may placed over the LED chips 1700, 1702 to protect them and form a lens. The encapsulant 1706 may be placed using various manufacturing methods, such as: glob-top, molding, casting, or vacuum printing encapsulation. In one embodiment, the substrate 1704 on which the LED chips 1700, 1702 are mounted may be a flexible printed circuit (FPC). In another embodiment, the substrate 1704 on which the LED chips 1700, 1702 are mounted may be a metal core printed circuit board (MCPCB). In the latter case, the MCPCB may function not only as the LED chip substrate 1704, but as part of the substrate 154 on which the light-guide plates 112, 114, 116 are assembled. Otherwise, a substrate 1704 such as a FPC may be mounted to (or abutted to) an aluminum substrate with a dielectric 1708 interposed there-between.

In one embodiment, an array of LEDs 602, 604 or LED chips 1700, 1702 is abutted to a light-guide plate surface 166 that is substantially perpendicular to its primary reflective surface 128 (e.g., mounted to an underhanging vertical edge 166 of a light-guide plate 114). See FIG. 3. Alternately, or additionally, an array of LEDs 1400, 1500, 1600 may be abutted to a light-guide plate's primary reflective surface 168, or to its reflective surface 130 that underhangs and abuts an adjacent light-guide plate 112. Preferably, however, all of the light sources 150 are positioned in the underhanging regions of light-guide plates 114, 116 (or, in the case of a light-guide plate 112 that is not overlapped at one end, in a similar region 118).

As previously mentioned, one or more heat dissipating elements 160, 162, 164 may be coupled to the backlight 104. By way of example, the heat dissipating elements 160, 162, 164 may be attached near the light sources 148, 150, 152, or under the primary reflective surfaces 124, 128 of the light-guide plates 112, 114, 116. In FIGS. 1-3, the heat dissipating elements 160, 162, 164 are coupled to the substrate 154 on which the light-guide plates 112, 114, 116 are assembled. However, in the absence of the substrate 154, the heat dissipating elements 160, 162, 164 could be coupled directly to one or more substrates 600 on which the light sources 148, 150, 152 are mounted, or to the primary reflective surfaces 124, 128 of the light-guide plates 112, 114, 116.

The heat dissipating elements 160, 162, 164 may conduct heat away from the backlight 104 by convection and radiation. In some embodiments, the heat dissipating elements 160, 162, 164 may comprise a plurality of fins separated by air gaps 170. If the fins are oriented such that the gaps between them are substantially aligned with the direction of gravity when the LCD 100 and backlight 104 are in use, hot air may rise in the air gaps 170 and pull up cooler air from the bottoms of the air gaps 170.

In some embodiments, the backlight 104 may comprise reflective elements, films or coatings that are applied to, or positioned adjacent, the external edges 142, 144, 146 of the backlight 104. See FIG. 2. In this manner, light rays may be prevented from refracting through the external edges 142, 144, 146 of the backlight 104, or may be reflected back into the backlight 104. By way of example, the reflective elements, films or coatings may be light diffusing or specular.

Figure 19:
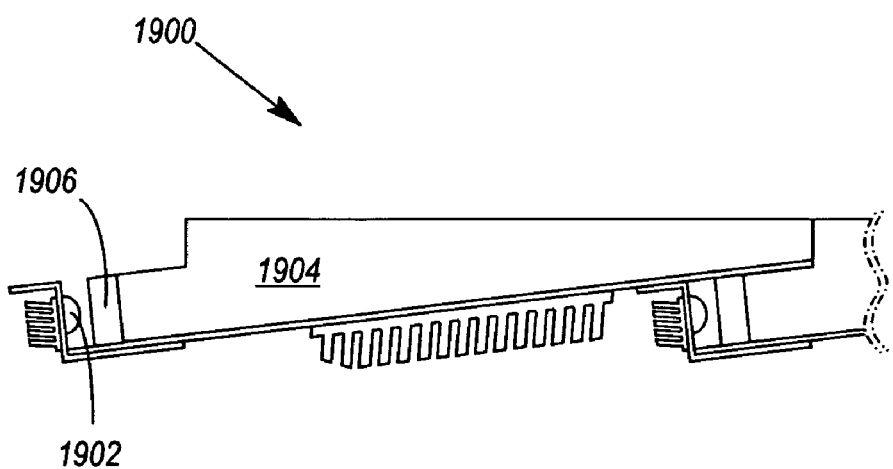
FIG. 19 illustrates an alternate arrangement for coupling the light emitted by a light source into a light-guide plate, wherein a light conditioner is interposed between the light source and light-guide plate.

FIG. 19 illustrates an alternate arrangement 1900 for coupling the light emitted by a light source 1902 into a light-guide plate 1904. The arrangement differs from that shown in FIGS. 1-3 in that the light source 1902 is spaced apart from the light-guide plate 1904, and one or more light conditioners 1906 are interposed there-between. By way of example, the light conditioners 1906 may comprise a number of light diffusing layers (e.g., elements, sheets or films), a number of prismatic layers, and/or a number of holographic light diffusing layers. In some cases, the light conditioners may be advantageously used to pre-mix the light emitted by differently colored LEDs.

Although the apparatus shown in FIGS. 1-3 and 19 has been described in the context of backlighting, it may be used in various applications where a light-emitting apparatus is needed. For example, a mood light or tiled light source could be assembled similarly to the backlight 104.

Depending on its configuration, the backlight 104 may provide a variety of advantages over other backlighting options. For example, as compared to some backlights, the backlight 104 provides additional surfaces for injecting light into the backlight (and the additional surfaces are distributed across the surface of the backlight). Further, given that light may be injected into the backlight from locations interior to the backlight 104, and not just from its perimeter, the light sources 148, 150, 152 used to light the backlight may sometimes take the form of low power LEDs, such as LEDs producing less than 200 milliWatts (mW) each. This may not only decrease the cost of the light sources 148, 150, 152, but it may 1) decrease the power consumed per square area of backlight surface, 2) reduce the amount of heat that a backlight generates, 3) increase the efficiency of the light sources, and 4) increase the lifetimes of any organic or polymeric components in a display system.

Lower power light sources also tend to have smaller form-factors, thereby making it possible to position them at a finer center-to-center pitch. In backlights that rely on mixing differently colored lights (e.g., red, green and blue lights), an ability to position them closer to one another increases the likelihood that their lights will thoroughly mix before being refracted from the light-emitting surface of the backlight.

In some embodiments, the lower power consumption and heat production of the backlight 104 will enable it to be built with smaller or no heat dissipating elements, thereby reducing the volume of space required to implement the backlight.

In some embodiments, the backlight 104 may also reduce the lengths of paths that light rays have to travel before refracting into a medium (e.g., air) that is adjacent to the backlight. Often, shorter length light paths will reduce the amount of light that is converted into heat and then absorbed by the backlight 104.

What is claimed is:

1. A light-emitting apparatus, comprising:
   a plurality of adjacent, overlapping light-guide plates formed of light-transmissive material, wherein each of the light-guide plates has i) first and second ends, ii) one or more light-emitting surfaces, and iii) one or more reflective surfaces to redirect light within the light-guide plate;
   wherein, where first and second light-guide plates are adjacent, the first end of the first light-guide plate A) underhangs the second end of the second light-guide plate, and B) is positioned opposite a primary light-emitting side of the apparatus;
   a plurality of light sources, optically coupled to the first ends of the light-guide plates to illuminate the interiors of the light-guide plates; and
   a substantially rigid and thermally conductive substrate on which the light-guide plates are assembled, the substrate comprising, for each of the light-guide plates, an elongate planar member which comprises a primary end and a secondary end, the planar member extending in a first direction from the primary end to the secondary end, the primary end comprising a stepped member which comprises:
      a first planar section that extends upwardly from the elongate planar member, the first planar section comprising an upper end and a lower end; and
      a second planar section at the upper end of the first planar section, the second planar section extending rearwardly from the first planar section in a second direction which is opposite from the first direction.

2. The light-emitting apparatus of claim 1, wherein each light-guide plate comprises a first reflective surface that is opposite said primary light-emitting side of the apparatus; and
   a second reflective surface that underhangs and abuts an adjacent light-guide plate.

3. The light-emitting apparatus of claim 2, wherein the first reflective surfaces are diffused reflective surfaces.

4. The light-emitting apparatus of claim 3, wherein the diffused reflective surfaces comprise dot patterns of diffused reflective surfaces.

5. The light-emitting apparatus of claim 4, further comprising a specular reflective layer positioned below the dot patterns of diffused reflective surfaces.

6. The light-emitting apparatus of claim 3, wherein at least one of the diffused reflective surfaces is a uniform diffused surface.

7. The light-emitting apparatus of claim 2, wherein the first reflective surfaces are specular reflective surfaces.

8. The light-emitting apparatus of claim 2, wherein the first reflective surfaces are polarizing reflective surfaces.

9. The light-emitting apparatus of claim 2, wherein each light source comprises a plurality of light-emitting diodes (LEDs).

10. The light-emitting apparatus of claim 9, wherein the LEDs comprise differently colored LEDs.

11. The light-emitting apparatus of claim 9, wherein one or more of the LEDs have a luminous intensity spatial distribution having rotational symmetry about its optical axis.

12. The light-emitting apparatus of claim 9, wherein one or more of the LEDs have an oval-shaped luminous intensity spatial distribution, with distinct major and minor axes in their luminous intensity spatial distribution.

13. The light-emitting apparatus of claim 12, wherein the oval-shaped luminous intensity spatial distribution has a viewing angle of between 20° and 90° in the minor axis, and a viewing angle of between 60° and 180° in the major axis.

14. The light-emitting apparatus of claim 12, wherein the minor axis of the luminous intensity spatial distribution is oriented perpendicular to the first reflective surface, and wherein the major axis of the luminous intensity spatial distribution is oriented parallel to the first reflective surface.

15. The light-emitting apparatus of claim 9, wherein the LEDs that are optically coupled to a common light-guide plate comprise a plurality of LED chips formed on a common substrate, with the LED chips being covered by an encapsulant.

16. The light-emitting apparatus of claim 9, wherein the LEDs that are optically coupled to a common light-guide plate are mounted on a substrate that is parallel to the LEDs' optical axes.

17. The light-emitting apparatus of claim 9, wherein the LEDs that are optically coupled to a common light-guide plate are mounted on a substrate that is perpendicular to the LEDs' optical axes.

18. The light-emitting apparatus of claim 2, wherein the light sources are abutted to light-guide plate surfaces that are perpendicular to said first reflective surfaces.

19. The light-emitting apparatus of claim 2, wherein the light sources are abutted to said first reflective surfaces.

20. The light-emitting apparatus of claim 2, wherein the light sources are abutted to said second reflective surfaces.

21. The light-emitting apparatus of claim 2, wherein said first reflective surfaces form an angle of between 0° and 20° with said primary light-emitting surface.

22. The light-emitting apparatus of claim 1, wherein the light sources are mounted on two or more surfaces of at least some light-guide plates, at the first ends of the light-guide plates.

23. The light-emitting apparatus of claim 1, further comprising
one or more heat dissipating elements, coupled to the substrate.

24. The light-emitting apparatus of claim 1, further comprising a number of heat dissipating elements that are coupled to the light sources.

25. The light-emitting apparatus of claim 1, further comprising light conditioners positioned between the light sources and the first ends of the light-guide plates.

26. The light-emitting apparatus of claim 25, wherein at least one of the light conditioners is a light diffusing layer.

27. The light-emitting apparatus of claim 25, wherein at least one of the light conditioners is a prismatic layer.

28. The light-emitting apparatus of claim 25, wherein at least one of the light conditioners comprises a holographic light diffusing layer.

29. The light-emitting apparatus of claim 1, further comprising a light-transmissive bonding material joining said light-guide plates.

30. The light-emitting apparatus of claim 1, further comprising one or more heat dissipating elements coupled to a side of the substantially rigid and thermally conductive substrate that is opposite a side of the substrate on which the light-guide plates are assembled.

31. The light-emitting apparatus of claim 1, wherein the elongate planar member and the stepped member are physically integral with each other.

32. A liquid crystal display, comprising:
a liquid crystal display panel having a plurality of LCD elements; and
a backlight positioned behind the display panel, the backlight comprising:
a plurality of adjacent, overlapping light-guide plates formed of light-transmissive material, wherein each of the light-guide plates has I) first and second ends, ii) one or more light-emitting surfaces, and iii) one or more reflective surfaces to redirect light within the light-guide plate; wherein, where first and second light-guide plates are adjacent, the first end of the first light-guide plate A) underhangs the second end of the second light-guide plate, and B) is positioned opposite a primary light-emitting side of the apparatus;
a plurality of light sources, optically coupled to the first ends of the light-guide plates to illuminate the interiors of the light-guide plates; and
a substantially rigid and thermally conductive substrate on which the light-guide plates are assembled, the substrate comprising, for each of the light-guide plates, an elongate planar member which comprises a primary end and a secondary end, the planar member extending in a first direction from the primary end to the secondary end, the primary end comprising a stepped member which comprises:
a first planar section that extends upwardly from the elongate planar member, the first planar section comprising an upper end and a lower end; and
a second planar section at the upper end of the first planar section, the second planar section extending rearwardly from the first planar section in a second direction which is opposite from the first direction.

33. The LCD of claim 32, further comprising a light conditioner, positioned between the backlight and the LCD panel.

34. The LCD of claim 33, wherein the light conditioner comprises one or more light diffusing layers.

35. The LCD of claim 33, wherein the light conditioner comprises one or more prismatic layers.

36. The LCD of claim 33, wherein the light conditioner comprises one or more light polarizing layers.

37. A light-emitting apparatus, comprising:
a plurality of adjacent, overlapping light-guide plates, at least one of the light-guide plates including:
first and second ends, the first end of which is adapted to receive light emitted by a light source;
a first reflective surface extending between said first and second ends;
a second reflective surface, opposite the first reflective surface and extending from said first end;
a light-emitting surface, opposite the first reflective surface and extending from said second end;
a surface that intersects and joins said second reflective surface to said light-emitting surface;
wherein the first reflective surface forms an acute angle with said light-emitting surface; and
a substantially rigid and thermally conductive substrate on which the light-guide plates are assembled, the substrate comprising, for each of the light-guide plates, an elongate planar member which comprises a primary end and a secondary end, the planar member extending in a first direction from the primary end to the secondary end, the primary end comprising a stepped member which comprises:
a first planar section that extends upwardly from the elongate planar member the first planar section comprising an upper end and a lower end; and
a second planar section at the upper end of the first planar section, the second planar section extending rearwardly from the first planar section in a second direction which is opposite from the first direction.

38. The light-emitting apparatus of claim 1, wherein the elongate planar member is physically separate from the stepped member.

* * * * *